(12) United States Patent
Taniyama

(10) Patent No.: US 9,019,132 B2
(45) Date of Patent: Apr. 28, 2015

(54) INFORMATION PROCESSING APPARATUS AND INPUT-MODE ADJUSTMENT METHOD

(75) Inventor: Kazutoshi Taniyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 869 days.

(21) Appl. No.: 13/067,512

(22) Filed: Jun. 6, 2011

(65) Prior Publication Data
US 2011/0234428 A1     Sep. 29, 2011

Related U.S. Application Data

(63) Continuation of application No. PCT/JP2009/050309, filed on Jan. 13, 2009.

(51) Int. Cl.
    *H03K 17/94*     (2006.01)
    *G06F 3/023*     (2006.01)

(52) U.S. Cl.
    CPC ............ *G06F 3/0233* (2013.01); *G06F 3/0237* (2013.01)

(58) Field of Classification Search
None
See application file for complete search history.

(56) References Cited

U.S. PATENT DOCUMENTS

| 8,232,901 B2 * | 7/2012 | Appleby et al. ............... 341/50 |
| 2002/0075309 A1 * | 6/2002 | Michelman et al. .......... 345/764 |

FOREIGN PATENT DOCUMENTS

| CN | 1085671 A | 4/1994 |
| JP | 58-004426 | 1/1983 |
| JP | 59-008044 | 1/1984 |
| JP | 61-243519 | 10/1986 |
| JP | 2000-231439 | 8/2000 |

OTHER PUBLICATIONS

International Search Report for PCT/JP2009/050309, Mailed Mar. 24, 2009.
Chinese Office Action issued Jul. 15, 2013 in corresponding Chinese Application No. 200980154507.X.

* cited by examiner

*Primary Examiner* — Firmin Backer
*Assistant Examiner* — Brian Wilson
(74) *Attorney, Agent, or Firm* — Staas & Halsey LLP

(57) ABSTRACT

An information processing apparatus, an input-mode adjustment method, and an input-mode adjustment program capable of allowing a user to input intended information are provided. The information processing apparatus determines whether the number of repetitions of deletion operation on information, such as a character string, is greater than a predetermined deletion operation threshold. When the number of deletion operations is greater than the deletion operation threshold, the information processing apparatus determines that a current input mode is not desired by a user, and changes the input mode.

7 Claims, 13 Drawing Sheets

FIG.3A

| sample.txt - A APPLICATION |
|---|
| ohayou. |

FIG.3B

| sample.txt - A APPLICATION |
|---|
| 6hay64. |

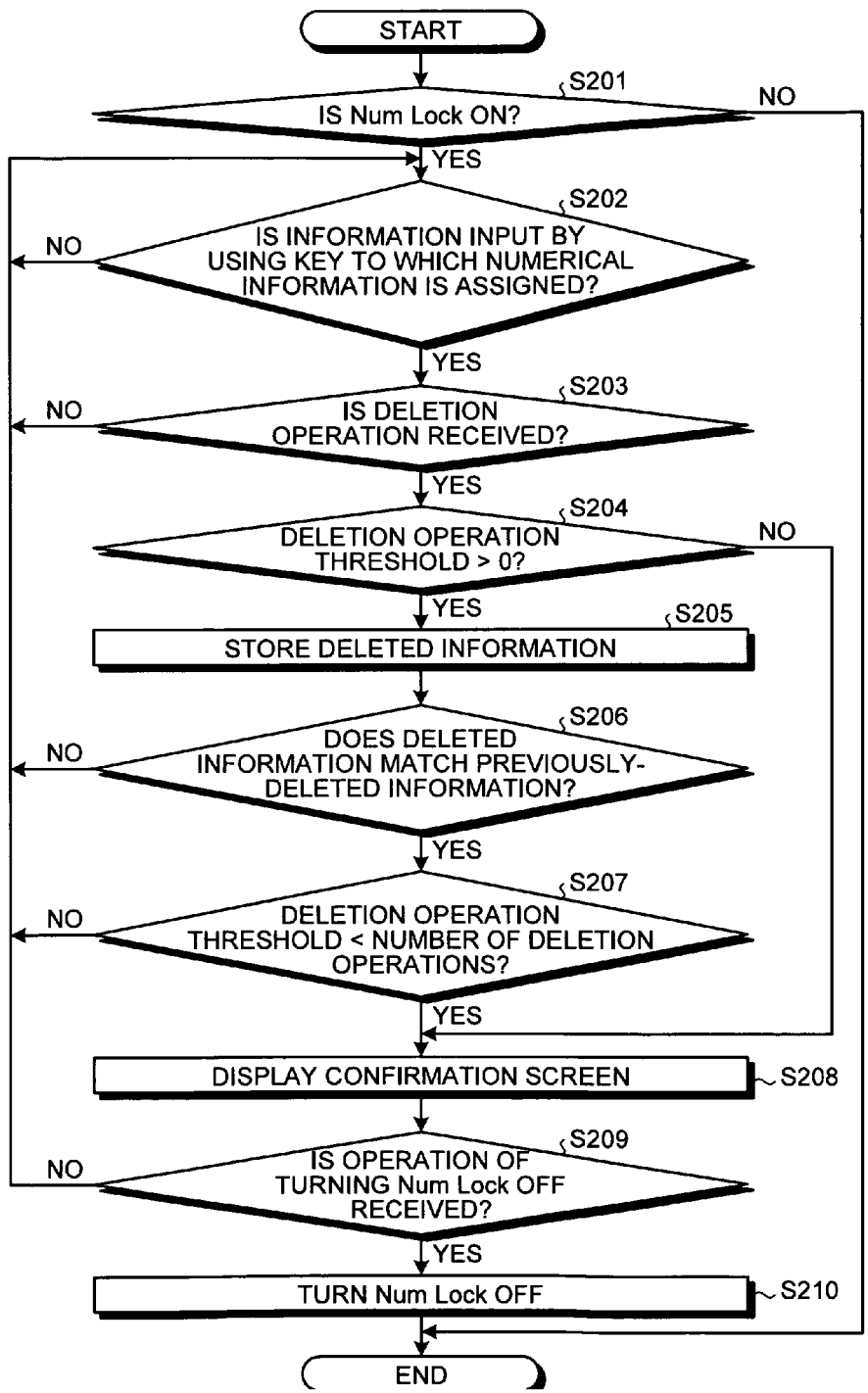

FIG.9A

| sample.txt - A APPLICATION |
|---|
| Good morning. |

FIG.9B

| sample.txt - A APPLICATION |
|---|
| gOOD MORNING. |

INFORMATION PROCESSING APPARATUS AND INPUT-MODE ADJUSTMENT METHOD

CROSS-REFERENCE TO RELATED APPLICATION

This application is a continuation of International Application No. PCT/JP2009/050309, filed on Jan. 13, 2009, the entire contents of which are incorporated herein by reference.

FIELD

The embodiments discussed herein are directed to an information processing apparatus and an input-mode adjustment method.

BACKGROUND

In general, a keyboard for operating an information processing apparatus, such as a personal computer, includes keys for inputting information (letters) and keys (hereinafter, referred to as "control keys") for switching information assigned to the keys for inputting information. Examples of the control keys include a "Num Lock key", a "Caps Lock key", a "Half-width/Full-width-Kanji key", and a "Katakana-Hiragana-Romaji key". In the following, the state in which predetermined information is assigned to any keys is referred to as an "input mode". For example, there are two input modes of Num-Lock-"ON" and Num-Lock-"OFF" that are switched from one to the other by pressing the Num Lock key.

For example, in the case of a keyboard without a numeric keypad as used in a notebook computer (also referred to as a "laptop computer"), information "1" is assigned to a key "J" and information "2" is assigned to a key "K" in the Num-Lock-"ON" state. Therefore, the keyboard without a numeric keypad can realize the same functions as those of a keyboard with a numeric keypad.

However, in recent years, a technology for automatically switching the above-mentioned input mode has been proposed. For example, a technology has been proposed in which, when a cursor is moved to a predetermined letter on a word processor, a shift state is returned to the state in which the letter pointed out by the cursor was input.

Patent Literature 1: Japanese Laid-open Patent Publication No. 61-243519
Patent Literature 2: Japanese Laid-open Patent Publication No. 59-008044
Patent Literature 3: Japanese Laid-open Patent Publication No. 2000-231439

However, the above conventional information processing apparatus has a problem in that a user may be prevented from inputting intended information.

More specifically, a user may mistakenly operate a control key during operation of the information processing apparatus. In this case, the user may not input intended information even if the user presses a predetermined key. For example, in a notebook computer, when the Num Lock key is pressed and the input mode of Num Lock is turned "ON", information "1", rather than information "J", is input by pressing the key "J".

Users who are not familiar with the operation of the information processing apparatus often do not know that there are control keys or how to operate the control keys (for example, operation of simultaneously pressing a control key and the Ctrl key). Therefore, such users may not be able to re-operate control keys in order to reset information assigned to each key after the users have mistakenly operated the control keys. In this case, the users cannot input intended information and get confused.

In general, the controls keys, such as a "Num Lock key" and a "Caps Lock key", are not frequently used, so that even users who are familiar with the operation of an information processing apparatus may not know that there are the control keys or how to operate the control keys. Therefore, it is highly possible that even users who are relatively familiar with the operation of the information processing apparatus cannot input intended information.

This type of problem cannot be solved even with the above-mentioned technology for automatically switching the input mode. This is because the above conventional technology is used to switch to the input mode corresponding to the input information pointed out by a cursor, and it is not always possible to switch to the input mode desired by a user.

Any components, expressions, arbitrary components, or the like of the information processing apparatus disclosed herein may be applied to any methods, apparatuses, systems, computer programs, recording media, data structures, or the like to form other embodiments.

SUMMARY

According to an aspect of an embodiment of the invention, an information processing apparatus includes an input unit that includes a key for inputting a first letter or a second letter; and a control key for switching information assigned to the key from one of the first letter and the second letter to the other one of the first letter and the second letter; a determining unit that determines that, when the second letter is assigned to the key by operating the control key and if deletion operation of deleting a letter that is input by operating the key is performed, the information assigned to the key is incorrect; and a changing unit that changes the information assigned to the key to the first letter when the determining unit determines that the information assigned to the key is incorrect.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3A is a diagram illustrating an example of input information with Num Lock OFF;

FIG. 3B is a diagram illustrating an example of input information with Num Lock ON;

FIG. 8 is a flowchart of a procedure of an input-mode adjustment process performed by the information processing apparatus according to the second embodiment;

FIG. 9A is a diagram illustrating an example of input information with Caps Lock OFF;

FIG. 9B is a diagram illustrating an example of input information with Caps Lock ON;

DESCRIPTION OF EMBODIMENTS

Figure 1:
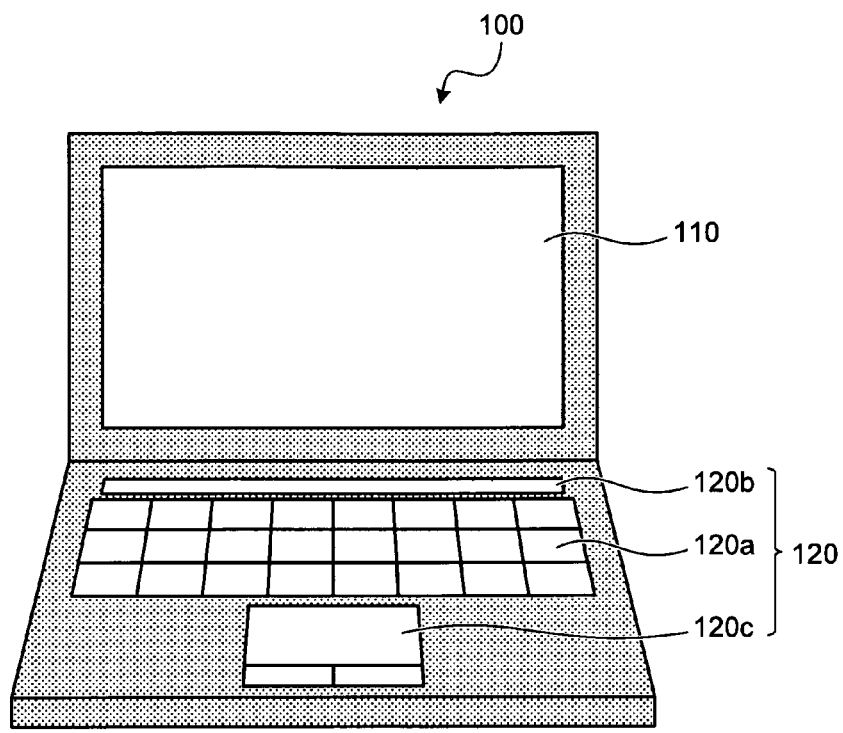
FIG. 1 is an external view of an information processing apparatus according to a first embodiment.

Preferred embodiments of the present invention will be explained with reference to accompanying drawings. The information processing apparatus, the input-mode adjustment method, and the input-mode adjustment program according to the present invention are not limited by the following embodiments. In the following embodiments, explanation is given by using a notebook computer as an example of the information processing apparatus. However, the present invention may be applied to any information processing apparatuses, such as a desktop computer and a portable information terminal, other than the notebook computer.

[a] First Embodiment

In a first embodiment, explanation is given of an information processing apparatus 100 that adjusts an input mode that is switched by pressing a Num Lock key (Num Lock switches "ON" and "OFF"). It is assumed that the information processing apparatus 100 according to the first embodiment is a notebook computer having a keyboard without a numeric keypad. That is, when Num Lock is "ON" in the information processing apparatus 100, for example, information "1" is assigned to a key "J" and information "2" is assigned to a key "K" as described above.

When Num Lock is "ON", and if information is input by using a key to which numerical information is assigned and then operation of deleting the input information (hereinafter, described as the "deletion operation") is performed, the information processing apparatus 100 according to the first embodiment stores the deleted information. When the same information is successively deleted a predetermined number of times or more, the information processing apparatus 100 determines that the state where Num Lock is "ON" is not the input mode desired by a user. "The predetermined number of times" is a predetermined threshold that is determined in advance by a manufacturer or a user of the information processing apparatus 100. In the following, the predetermined threshold is described as the "deletion operation threshold".

When determining that Num-Lock-"ON" is not the input mode desired by a user, the information processing apparatus 100 changes the input mode to Num-Lock-"OFF" to change information assigned to keys.

For example, when the Num Lock is "ON", and if a user repeats operation of pressing a key "J" to thereby input information "1" and operation of deleting the information "1", the information processing apparatus 100 determines whether the number of repetitions of the deletion operation is greater than the deletion operation threshold. When the number of deletion operations is greater than the deletion operation threshold, the information processing apparatus 100 changes the input mode to Num-Lock-"OFF".

Explanation is given of why it is determined that Num-Lock-"ON" is not the input mode desired by a user when the same information is successively deleted. In general, the operation of successively deleting the same information corresponds to operation described below.

One operation is as follows. When a user mistakenly presses a key other than a key for inputting desired information, the user deletes the input information because undesired information has been input. Thereafter, when the user again mistakenly inputs the same information as the deleted information, the user again deletes the information. Such operation corresponds to the operation of successively deleting the same information.

Another operation is as follows. When a user presses a key for inputting desired information, and if desired information is not input because Num Lock is "ON", the user deletes the input information. Thereafter, if the user does not notice that Num Lock is "ON", and again inputs the same information as the deleted information, the user again deletes the information. Such operation corresponds to the operation of successively deleting the same information.

Of the above two types of operation, it is less likely that a user repeatedly performs the former operation, which is the operation of mistakenly inputting the same information. Therefore, in general, it is reasonable to consider that the latter operation has been performed. This is because it is possible that a user may not be familiar with the operation of the information processing apparatus 100 and may not know that there is the Num Lock key or how to operate the Num Lock key. Besides, it is also possible that even a user who is familiar with the operation of the information processing apparatus 100 may not know that there is the Num Lock key or how to operate the Num Lock key because the user does not frequently use the Num Lock key.

Therefore, when the same information is successively deleted, the information processing apparatus 100 of the first embodiment determines that Num-Lock-"ON" is not the input mode desired by a user.

As described above, when the deletion operation on the same information is repeated in the Num-Lock-"ON" state, the information processing apparatus 100 of the first embodiment changes the input mode to Num-Lock-"OFF". Therefore, it is possible to adjust the input mode to the state desired by a user. That is, a user using the information processing apparatus 100 can input desired information even when the user mistakenly operates the Num Lock key without knowing how to operate the Num Lock key.

The exterior of the information processing apparatus 100 of the first embodiment will be described below. FIG. 1 is an external view of the information processing apparatus 100 according to the first embodiment. As illustrated in FIG. 1, the information processing apparatus 100 is a notebook computer and includes a display unit 110 and an operating unit 120.

The display unit 110 is a display device for displaying various types of information. The display unit 110 is, for example, a liquid crystal display. The operating unit 120 is an input device for inputting various types of information and operating instructions, and includes a key group 120a, a control key 120b, and a touchpad 120c.

The key group 120a is formed of one or more keys for inputting various types of information, and one or more information is assigned to each key. When pressed, each key of the key group 120a inputs information assigned thereto in the information processing apparatus 100.

The control key 120b is a key for switching information assigned to the key group 120a. Examples of the control key 120b include a "Num Lock key", a "Caps Lock key", a "Half-width/Full-width-Kanji key", and a "Katakana-Hiragana-Romaji key". In general, the key group 120a and the control key 120b are collectively referred to as a keyboard.

The touchpad 120c is a pointing device for operating a pointer and an icon that are displayed on the display unit 110. For example, the touchpad 120c corresponds to a mouse used with a desktop personal computer.

Figure 2:
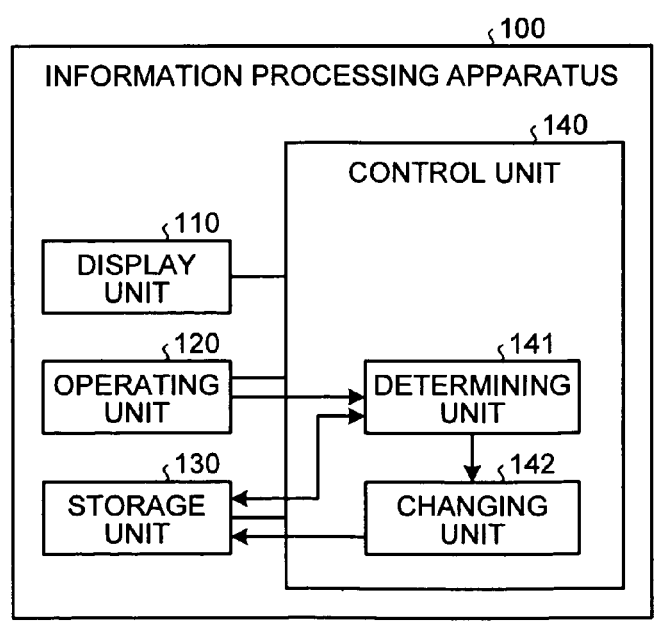
FIG. 2 is a diagram illustrating a configuration of the information processing apparatus according to the first embodiment.

The configuration of the information processing apparatus 100 of the first embodiment will be described below. FIG. 2 is a diagram illustrating the configuration of the information processing apparatus 100 according to the first embodiment. As illustrated in FIG. 2, the information processing apparatus 100 includes the display unit 110, the operating unit 120, a storage unit 130, and a control unit 140.

The display unit 110 and the operating unit 120 respectively correspond to the display unit 110 and the operating unit 120 illustrated in FIG. 1. Examples of how various applications in the information processing apparatus 100 are operated by using the operating unit 120 will be described below.

A user activates word processing software, spreadsheet software, browser, or the like by operating the operating unit 120. Accordingly, the word processing software, the spreadsheet software, the browser, or the like corresponding to the activated applications are displayed on the display unit 110. While the word processing software or the like is displayed on the display unit 110, the user inputs information, such as a character string, by operating the key group 120a of the operating unit 120.

The user may input information, such as a character string, after changing the input mode by operating the control key 120b in the operating unit 120. For example, a user who uses a notebook computer without a numeric keypad, which is like the information processing apparatus 100 according to the first embodiment, may assign information "1" to a key "J" and information "2" to a key "K" by operating the Num Lock key. In this case, the user uses the keys "J" and "K" as the numeric keypad.

The storage unit 130 is a storage device for storing various types of information. Examples of the storage unit 130 include a RAM (Random Access Memory) and a hard disk drive. The storage unit 130 of the first embodiment stores information on the "input mode" indicating information that is currently assigned to the key group 120a. The storage unit 130 also stores the deletion operation threshold, information on the deleted character string, and the like. For example, the storage unit 130 stores, as the input mode, whether Num Lock is currently in the "ON" state or in the "OFF" state. For example, the storage unit 130 stores "3" as the deletion operation threshold. The user can change the deletion operation threshold stored in the storage unit 130.

The control unit 140 controls various processing performed by the information processing apparatus 100, and includes a determining unit 141 and a changing unit 142 as the features of the information processing apparatus 100 of the first embodiment. In FIG. 2, only processing units related to an input-mode adjustment process performed by the information processing apparatus 100 are illustrated.

When the deletion operation on the same information is successively performed in the Num-Lock-"ON" state, the determining unit 141 determines that Num-Lock-"ON" is not the input mode desired by a user.

More specifically, in the Num-Lock-"ON" state, the determining unit 141 monitors whether the user inputs information by using a key with assigned numerical information or the like and whether the user subsequently performs the deletion operation on the input information. When the deletion operation on the same information is successively performed, the determining unit 141 determines whether the number of deletion operations is greater than the deletion operation threshold stored in the storage unit 130. When the number of deletion operations is greater than the deletion operation threshold, the determining unit 141 determines that the state where Num Lock is "ON" is not the input mode desired by the user.

The determining unit 141 may determine that the deletion operation is successively performed on "the same information" when parts of the pieces of successively-deleted information are the same. For example, suppose that following character strings are successively deleted in this order.

That is, "6hay64", "6ha", "6hay", and "6" are deleted.

In the above example, the initial letter of all of the successively-deleted character strings is "6". In this case, the determining unit 141 may determine that the deletion operation is successively performed on "the same information". This is because a user does not always notice an input error at the same timing. In the above example, the user may notice the input error when the user inputs "6hay64" or when the user inputs "6ha". That is, even when the same character string is repeatedly input by mistake, it is not always the case that the completely same character strings are input.

A determination process performed by the determining unit 141 will be explained in detail below with examples illustrated in FIGS. 3A and 3B. FIG. 3A is a diagram illustrating an example of input information with Num Lock OFF. FIG. 3B is a diagram illustrating an example of input information with Num Lock ON. In these examples, it is assumed that the deletion operation threshold is set to "3" and Num Lock is "ON".

In this state, as illustrated in FIG. 3A, suppose that a user wants to input a character string "ohayou." by using predetermined word processing software. However, because Num Lock is "ON", the user cannot input "ohayou." even the user presses keys "O", "H", "A", "Y", "O", "U", and "." of the key group 120a. More specifically, as illustrated in FIG. 3B, a character string "6hay64." is input. The character string to be input at this time depends on the functions of the information processing apparatus 100, and is not always "6hay64.". However, when Num Lock is "ON", it is generally impossible to input "ohayou." by pressing keys "O", "H", "A", "Y", "O", "U", and ".".

In this case, the user deletes the character string "6hay64.". If the user is familiar with the operation of the information processing apparatus 100, the user can operate the Num Lock key to change the input mode to Num-Lock-"OFF" and then inputs "ohayou." again. However, if the user is not familiar with how to operate the Num Lock key, the user may repeat operation of inputting a part of the character string "6hay64" and deleting the input information without operating the Num Lock key.

At this time, the determining unit 141 stores the deleted character string "6hay64." in the storage unit 130. When the character string "6hay64." or a part of the character string "6hay64." is deleted again, the determining unit 141 stores the deleted character string in the storage unit 130. When the determining unit 141 successively stores the character string "6hay64." or a part of the character string "6hay64." four times in the storage unit 130, because the number of repetitions of the deletion operation "4" is greater than the deletion operation threshold "3", the determining unit 141 determines that the state where Num Lock is "ON" is not the input mode desired by the user.

The changing unit 142 changes the input mode when the determining unit 141 determines that the current input mode is not desired by the user. More specifically, when the determining unit 141 determines that the state where Num Lock is "ON" is not the input mode desired by the user, the changing unit 142 changes the input mode to Num-Lock-"OFF".

Figure 4:
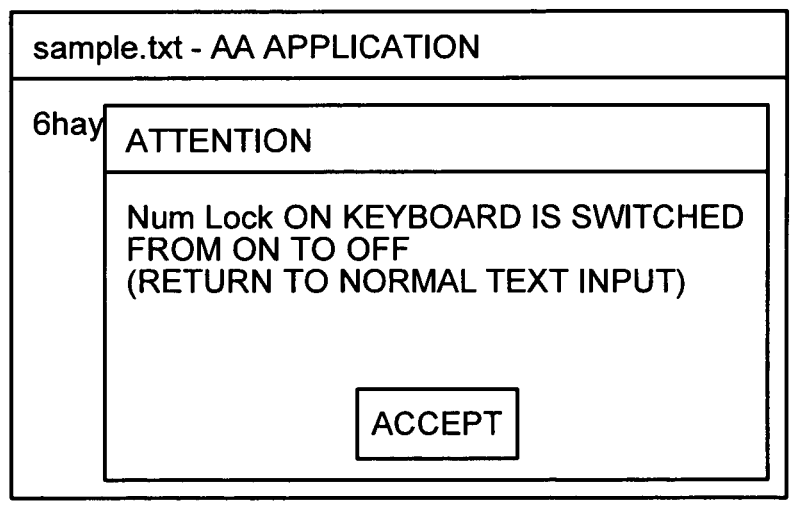
FIG. 4 is a diagram illustrating an example of a screen for giving notice that an input mode is changed.

When changing the input mode, the changing unit 142 may notify the user that the input mode is changed. For example, the changing unit 142 may control the display unit 110 to display a predetermined screen or may output predetermined sound in order to give notice that the input mode is changed. FIG. 4 illustrates an example of a screen for giving notice that the input mode is changed. When changing the input mode, the changing unit 142 may display a pop-up screen containing a message as illustrated in FIG. 4 on the display unit 110. Accordingly, the changing unit 142 can notify the user that the input mode is changed.

Figure 5:
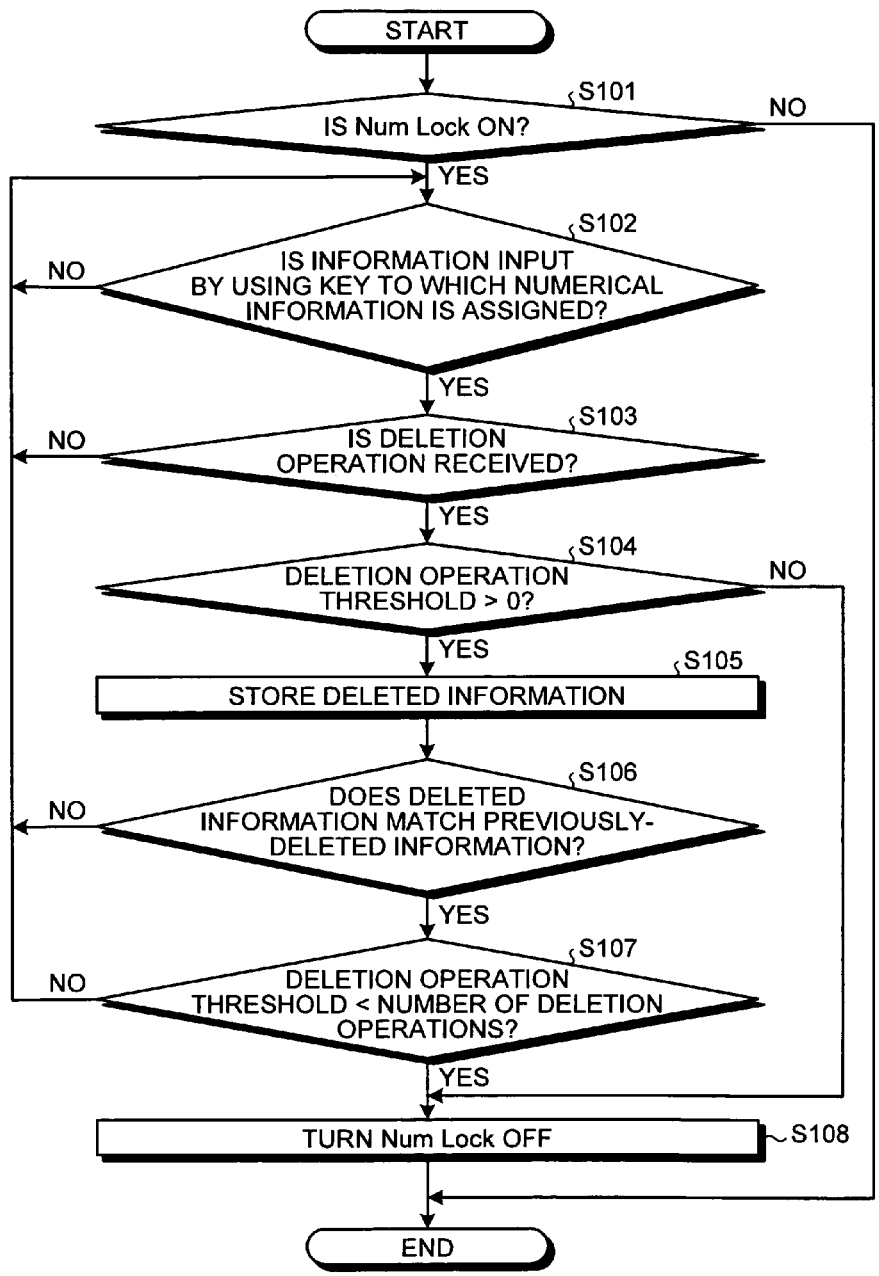
FIG. 5 is a flowchart of a procedure of an input-mode adjustment process performed by the information processing apparatus according to the first embodiment.

A procedure of an input-mode adjustment process performed by the information processing apparatus 100 according to the first embodiment will be described below. FIG. 5 is a flowchart of a procedure of the input-mode adjustment process performed by the information processing apparatus 100 according to the first embodiment.

As illustrated in FIG. 5, when Num Lock is "ON" (YES at Step S101), and when information is input by using a key to which numerical information or the like is assigned (for example, a key "K") (YES at Step S102), the determining unit 141 of the information processing apparatus 100 monitors whether the deletion operation is performed.

On the other hand, when Num Lock is "OFF" (NO at Step S101), the determining unit 141 ends the process. Even when Num Lock is "ON" (YES at Step S101), if information is not input by using a key to which numerical information or the like is assigned (NO at Step S102) or if the deletion operation is not received (NO at Step S103), the determining unit 141 returns the process to Step S102. That is, when information is input again by using a key to which numerical information or the like is assigned (YES at Step S102), the determining unit 141 monitors whether the deletion operation is performed.

When the deletion operation is performed (YES at Step S103), and if the deletion operation threshold stored in the storage unit 130 is greater than "0" (YES at Step S104), the determining unit 141 stores the deleted information (letters, character strings, and the like) in the storage unit 130 (Step S105).

When the deleted information and the previously-deleted information do not match each other (NO at Step S106), the determining unit 141 returns the process to Step S102 described above. More specifically, when information is input by using a key to which numerical information or the like is assigned (YES at Step S102), the determining unit 141 monitors whether the deletion operation is performed.

On the other hand, when the deleted information and the previously-deleted information match each other (YES at Step S106), the determining unit 141 determines whether the number of repetitions of the deletion operation on the deleted information is greater than the deletion operation threshold.

When the number of deletion operations is greater than the deletion operation threshold (YES at Step S107), the determining unit 141 determines that Num-Lock-"ON" is not the input mode desired by the user. Subsequently, the changing unit 142 changes the input mode to Num-Lock-"OFF" (Step S108). At this time, the changing unit 142 may control the display unit 110 to display a screen as illustrated in FIG. 4 or may output predetermined sound in order to give notice that the input mode is changed.

On the other hand, when the number of deletion operations is equal to or smaller than the deletion operation threshold (NO at Step S107), the determining unit 141 returns the process to Step S102 described above. Then, when information is input by using a key to which numerical information or the like is assigned (YES at Step S102), the determining unit 141 monitors whether the deletion operation is performed.

When the deletion operation threshold stored in the storage unit 130 is equal to or smaller than "0" (NO at Step S104), the determining unit 141 determines that Num-Lock-"ON" is not the input mode desired by the user without performing the processing from Step S105 to Step S107. Accordingly, the changing unit 142 changes the input mode to Num-Lock-"OFF" (Step S108).

As described above, when the deletion operation on the same information is repeated in the Num-Lock-"ON" state, the information processing apparatus 100 according to the first embodiment turns Num Lock "OFF". Consequently, the information processing apparatus 100 can adjust the input mode to the state desired by the user. As a result, it is possible to allow the user to input intended information.

[b] Second Embodiment

The first embodiment is explained with an example in which the input mode is automatically adjusted when the deletion operation on the same information is repeated. However, the information processing apparatus may adjust the input mode after confirming with a user whether the user changes the input mode. In a second embodiment, explanation is given of an example of an information processing apparatus that turns Num Lock "OFF" after confirming with a user whether the user changes the input mode.

Figure 6:
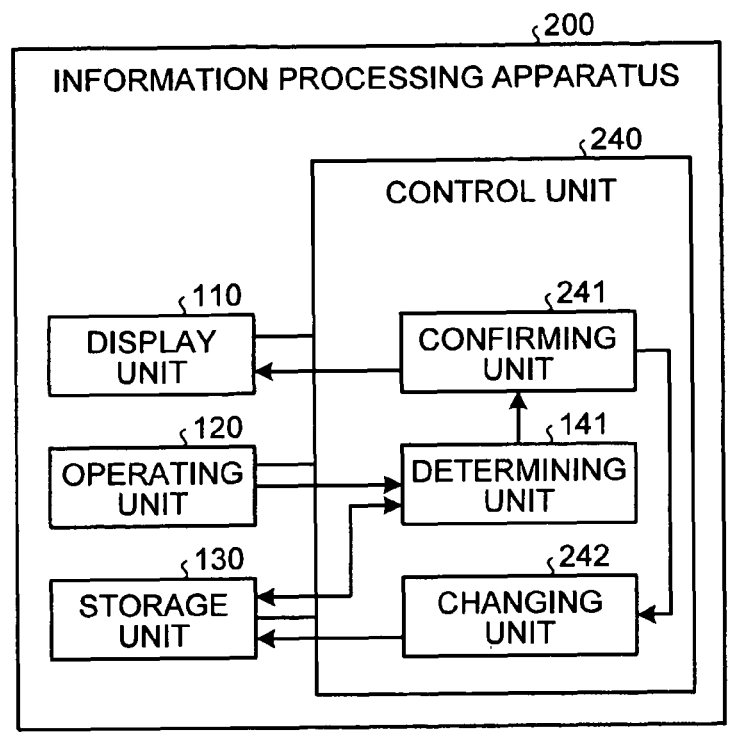
FIG. 6 is a diagram illustrating a configuration of an information processing apparatus according to a second embodiment.

The configuration of an information processing apparatus 200 according to the second embodiment will be described below. FIG. 6 is a diagram illustrating the configuration of the information processing apparatus 200 according to the second embodiment. Components having the same functions as those of the components illustrated in FIG. 2 are denoted by the same reference numerals, and detailed explanation thereof is not repeated. As illustrated in FIG. 6, the information processing apparatus 200 includes a control unit 240 instead of the control unit 140 of the information processing apparatus 100 illustrated in FIG. 2.

The control unit 240 includes a confirming unit 241, unlike the control unit 140 illustrated in FIG. 2. The control unit 240 includes a changing unit 242 instead of the changing unit 142 of the control unit 140.

When the determining unit 141 determines that the state where Num Lock is "ON" is not the input mode desired by the user, the confirming unit 241 confirms with a user whether the user changes the input mode.

More specifically, the confirming unit 241 controls the display unit 110 to display a screen for confirming whether to change the input mode (hereinafter, referred to as the "confirmation screen") to see if it is allowed to turn Num Lock "OFF". When receiving operation of changing the input mode through the confirmation screen, the confirming unit 241 determines that it is allowed to change the input mode. On the other hand, when receiving operation of maintaining the input mode unchanged through the confirmation screen, the confirming unit 241 determines that it is not allowed to change the input mode.

Figure 7:
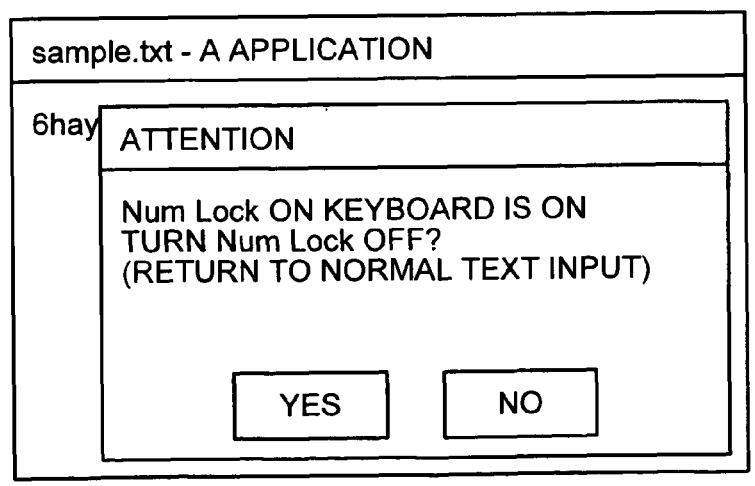
FIG. 7 is a diagram illustrating an example of a screen for confirming whether to change an input mode.

FIG. 7 illustrates an example of the screen for confirming whether to change the input mode. As illustrated in FIG. 7, the confirming unit 241 controls the display unit 110 to display a pop-up screen containing a message for confirming whether to change the input mode. For example, when "YES" is pressed on the screen illustrated in FIG. 7, the confirming unit 241 determines that it is allowed to change the input mode. On the other hand, when "NO" is pressed on the screen illustrated in FIG. 7, the confirming unit 241 determines that it is not allowed to change the input mode.

When the confirming unit 241 confirms that it is allowed to change the input mode, the changing unit 242 changes the input mode of Num Lock to "OFF". In the example illustrated in FIG. 7, when "YES" is pressed on the screen illustrated in FIG. 7, the changing unit 242 changes the input mode of Num Lock to "OFF". On the other hand, when "NO" is pressed on the screen illustrated in FIG. 7, the changing unit 242 maintains the input mode of Num-Lock-"ON" without any change.

A procedure of an input-mode adjustment process performed by the information processing apparatus 200 according to the second embodiment will be described below. FIG. 8 is a flowchart of a procedure of the input-mode adjustment process performed by the information processing apparatus according to the second embodiment. In the following, explanation of the same processing procedures (Step S201 to Step S206) as those illustrated in FIG. 5 is not repeated.

As illustrated in FIG. 8, when the determining unit 141 determines that the number of deletion operations is greater than the deletion operation threshold (YES at Step S207) or when the deletion operation threshold is equal to or smaller than "0" (NO at Step S204), the confirming unit 241 of the information processing apparatus 200 controls the display unit 110 to display the confirmation screen for confirming whether to change the input mode (Step S208).

When receiving operation of changing the input mode through the confirmation screen (YES at Step S209), the changing unit 242 changes the input mode of Num Lock to "OFF" (Step S210).

On the other hand, when receiving operation of maintaining the input mode unchanged through the confirmation screen (NO at Step S209), the changing unit 242 maintains the input mode of Num-Lock-"ON" without any change. Then, the determining unit 141 returns the process to Step S202. When information is again input by using a key to which numerical information or the like is assigned (Yes at Step S202), the determining unit 141 monitors whether the deletion operation is performed.

As described above, when the deletion operation on the same information is repeated in the Num-Lock-"ON" state, the information processing apparatus 200 according to the second embodiment confirms with a user whether the user changes the input mode. When receiving operation of changing the input mode from the user, the information processing apparatus 200 changes the input mode of Num Lock to "OFF". Therefore, the information processing apparatus 200 according to the second embodiment can adjust the input mode to the state desired by the user when the user wants to change the input mode.

[c] Third Embodiment

The first and the second embodiments are explained by using the Num Lock key as an example of the control key. However, the information processing apparatus can adjust other input modes that are controlled by control keys other than the Num Lock key. For example, the information processing apparatus can adjust the input mode controlled by a control key, such as a "Caps Lock key", a "Half-width/Full-width-Kanji key", or a "Katakana-Hiragana-Romaji key". In a third embodiment, explanation is given of an information processing apparatus 300 that adjusts an input mode that is controlled by using a control key other than the Num Lock key.

First, the information processing apparatus 300 according to the third embodiment is explained by using a Caps Lock key as an example. The configuration of the information processing apparatus 300 according to the third embodiment is the same as the configuration illustrated in FIG. 2 or FIG. 6. FIG. 9A is a diagram illustrating an example of input information with Caps Lock OFF. FIG. 9B is a diagram illustrating an example of input information with Caps Lock ON.

For example, as illustrated in FIG. 9A, suppose that a user wants to input a character string "Good morning.". However, if Caps Lock is "ON", the user cannot input "Good morning." even when the user presses keys "G", "O", "O", . . . "I", "N", "G", and ".". More specifically, as illustrated in FIG. 9B, a character string "gOOD MORNING." for example is input in word processing software.

Therefore, when the deletion operation on the same information is repeated while Caps Lock is "ON", the information processing apparatus 300 turns Caps Lock "OFF".

More specifically, when operation of inputting predetermined information and deleting the input information is repeated while Caps Lock is "ON", the information processing apparatus 300 determines whether the number of deletion operations is greater than the deletion operation threshold. When the number of deletion operations is greater than the deletion operation threshold, the information processing apparatus 300 turns Caps Lock "OFF".

Figure 10:
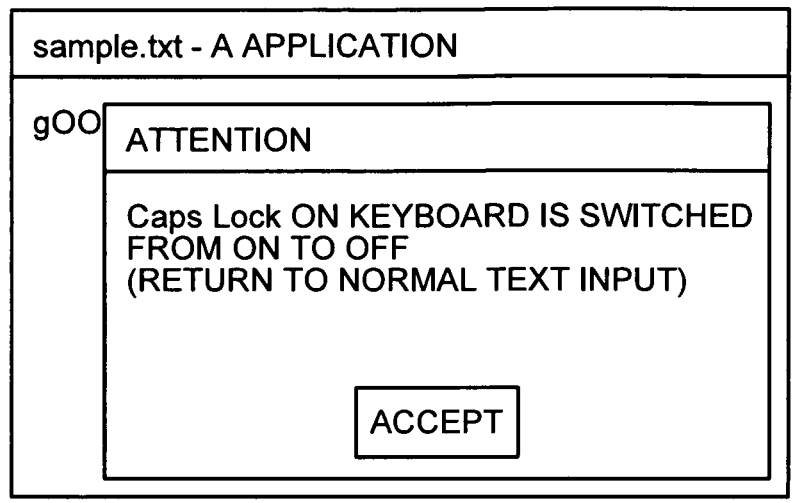
FIG. 10 is a diagram illustrating an example of a screen for giving notice that an input mode is changed.

Similarly to the information processing apparatus 100 according to the first embodiment, the information processing apparatus 300 may control the display unit 110 to display a screen for giving notice that the input mode is changed after the information processing apparatus has turned Caps Lock "OFF". For example, the information processing apparatus 300 may control the display unit 110 to display a pop-up screen containing a message as illustrated in FIG. 10.

Figure 11:
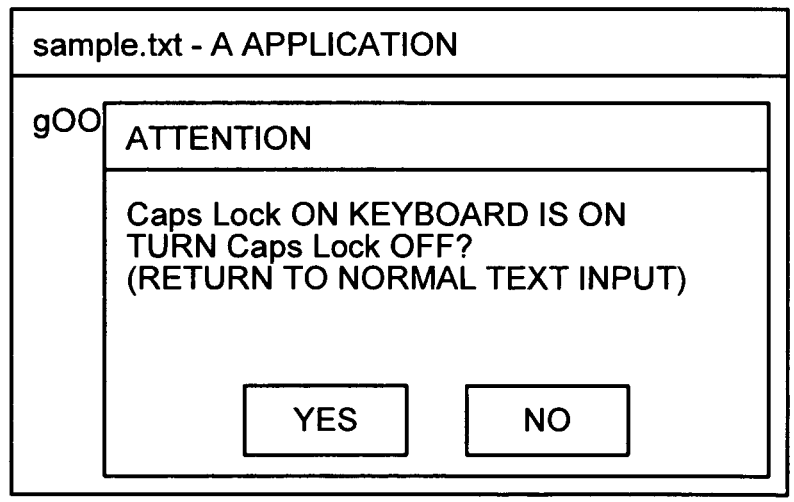
FIG. 11 is a diagram illustrating an example of a screen for confirming whether to change the input mode.

Furthermore, similarly to the information processing apparatus 200 according to the second embodiment, the information processing apparatus 300 may turn Caps Lock "OFF" after controlling the display unit 110 to display a confirmation screen and confirming with a user whether the user changes the input mode. For example, the information processing apparatus 300 controls the display unit 110 to display a confirmation screen as illustrated in FIG. 11 in order to confirm with the user whether the user changes the input mode. Thereafter, when "YES" is pressed on the confirmation screen, the information processing apparatus 300 turns Caps Lock "OFF".

A procedure of a Caps-Lock input-mode adjustment process performed by the information processing apparatus 300 according to the third embodiment will be described below.

Figure 12:
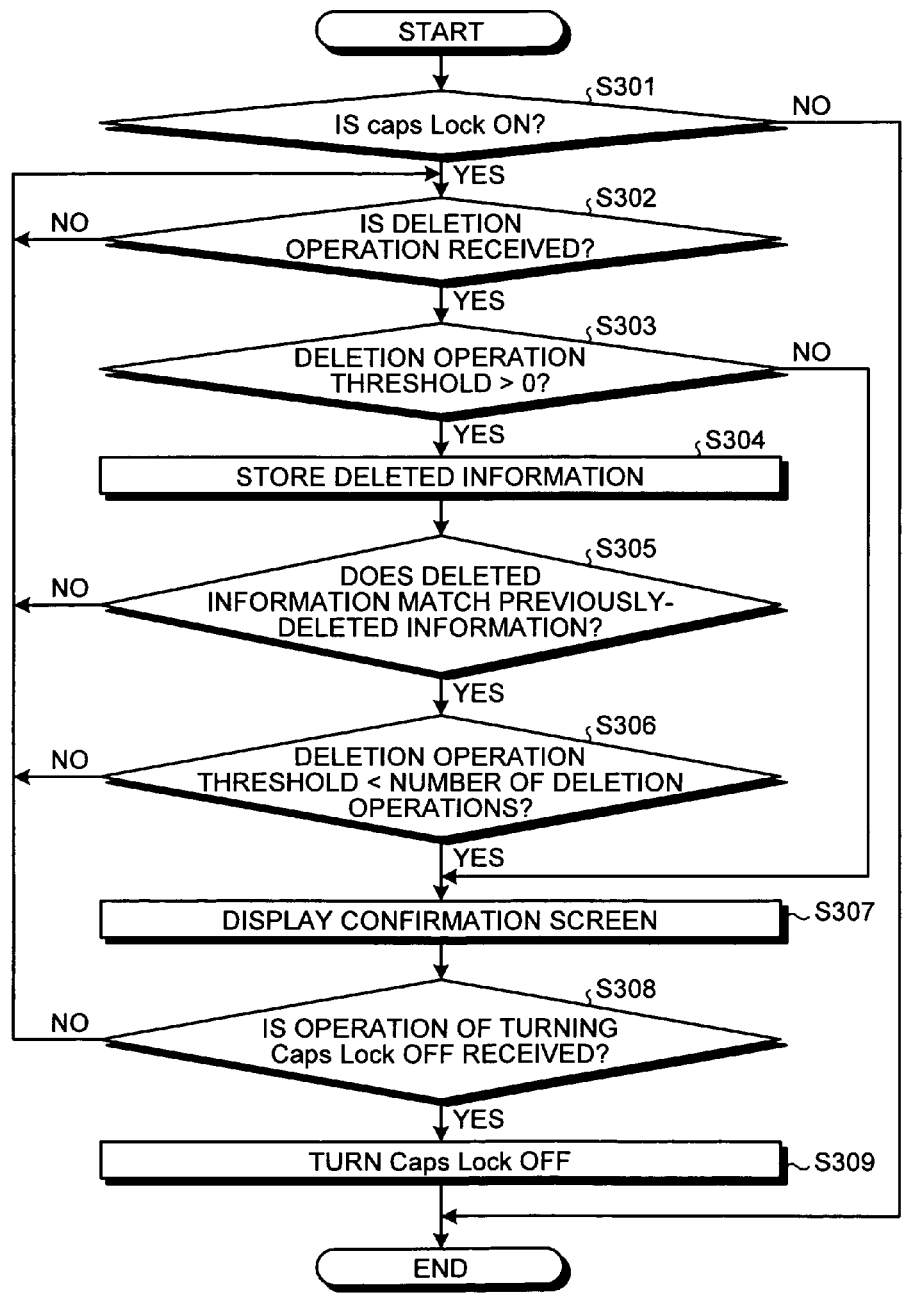
FIG. 12 is a flowchart of a procedure of a Caps-Lock input-mode adjustment process performed by an information processing apparatus according to a third embodiment.

FIG. 12 is a flowchart of a procedure of the Caps-Lock input-mode adjustment process performed by the information processing apparatus 300 according to the third embodiment. In FIG. 12, the information processing apparatus 300 changes the input mode after confirming with a user whether the user changes the input mode, similarly to the information processing apparatus 200 according to the second embodiment.

As illustrated in FIG. 12, when Caps Lock is "ON" (YES at Step S301), the determining unit 141 of the information processing apparatus 300 monitors whether the deletion operation on the input information is performed. The processing procedure from Step S302 to Step S306 is the same as the processing procedure from Step S203 to Step S207 illustrated in FIG. 8.

When the determining unit 141 determines that the number of deletion operations is greater than the deletion operation threshold (YES at Step S306), the confirming unit 241 of the information processing apparatus 300 controls the display unit 110 to display the confirmation screen (Step S307).

When receiving operation of changing the input mode through the confirmation screen (YES at Step S308), the changing unit 242 changes the input mode of Caps Lock to "OFF" (Step S309).

As described above, when the deletion operation is performed while Caps Lock is "ON", the information processing apparatus 300 according to the third embodiment turns Caps Lock "OFF". Therefore, the information processing apparatus 300 according to the third embodiment can adjust the input mode of Caps Lock to the state desired by a user.

While the example is explained in which the input mode of Caps Lock is adjusted, the information processing apparatus can adjust any input modes that are controlled by other control keys, such as a "Half-width/Full-width-Kanji key" and a "Katakana-Hiragana-Romaji key", as mentioned above.

Processes for adjusting input modes controlled by other control keys, such as a "Half-width/Full-width-Kanji key" and a "Katakana-Hiragana-Romaji key", will be described below with reference to flowcharts. In the following, the information processing apparatus 300 changes the input mode after confirming with a user whether the user changes the input mode, similarly to the information processing apparatus 200 according to the second embodiment.

Figure 13:
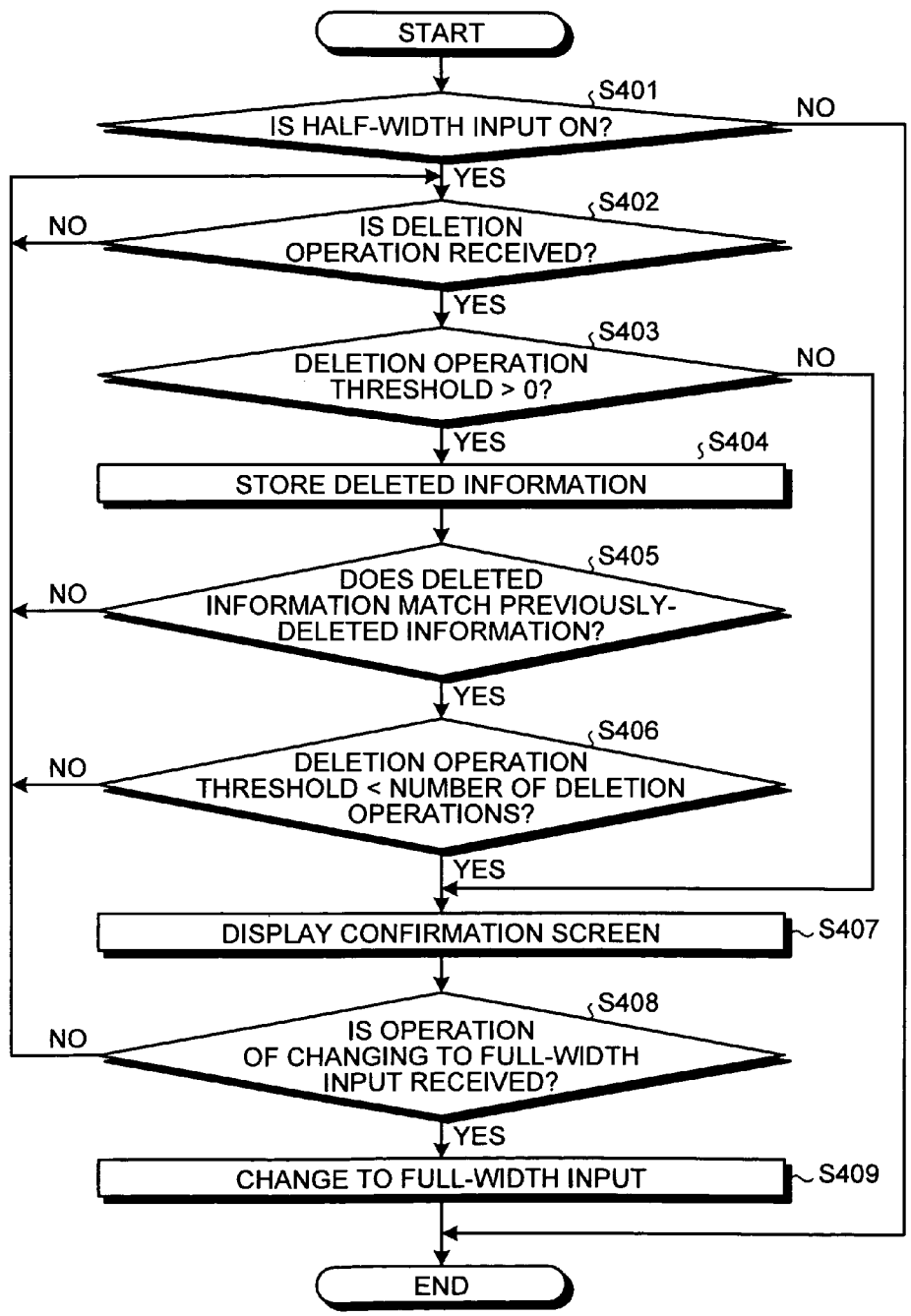
FIG. 13 is a flowchart of a procedure of a Half-width/Full-width input-mode adjustment process performed by the information processing apparatus according to the third embodiment.

A procedure of a Half-width/Full-width input-mode adjustment process performed by the information processing apparatus 300 according to the third embodiment will be described below. FIG. 13 is a flowchart of a procedure of the Half-width/Full-width input-mode adjustment process performed by the information processing apparatus according to the third embodiment. The input mode of Half-width/Full-width is controlled by a Half-width/Full-width-Kanji key.

As illustrated in FIG. 13, when the input mode of Half-width/Full-width is in a "Half-width input" state (YES at Step S401), the determining unit 141 of the information processing apparatus 300 monitors whether the deletion operation on the input information is performed. The processing procedure from Step S402 to Step S407 is the same as the processing procedure from Step S302 to Step S307 illustrated in FIG. 12.

When receiving operation of changing the input mode through the confirmation screen (YES at Step S408), the changing unit 242 of the information processing apparatus 300 changes the input mode of Half-width/Full-width to "Full-width input" (Step S409).

Figure 14:
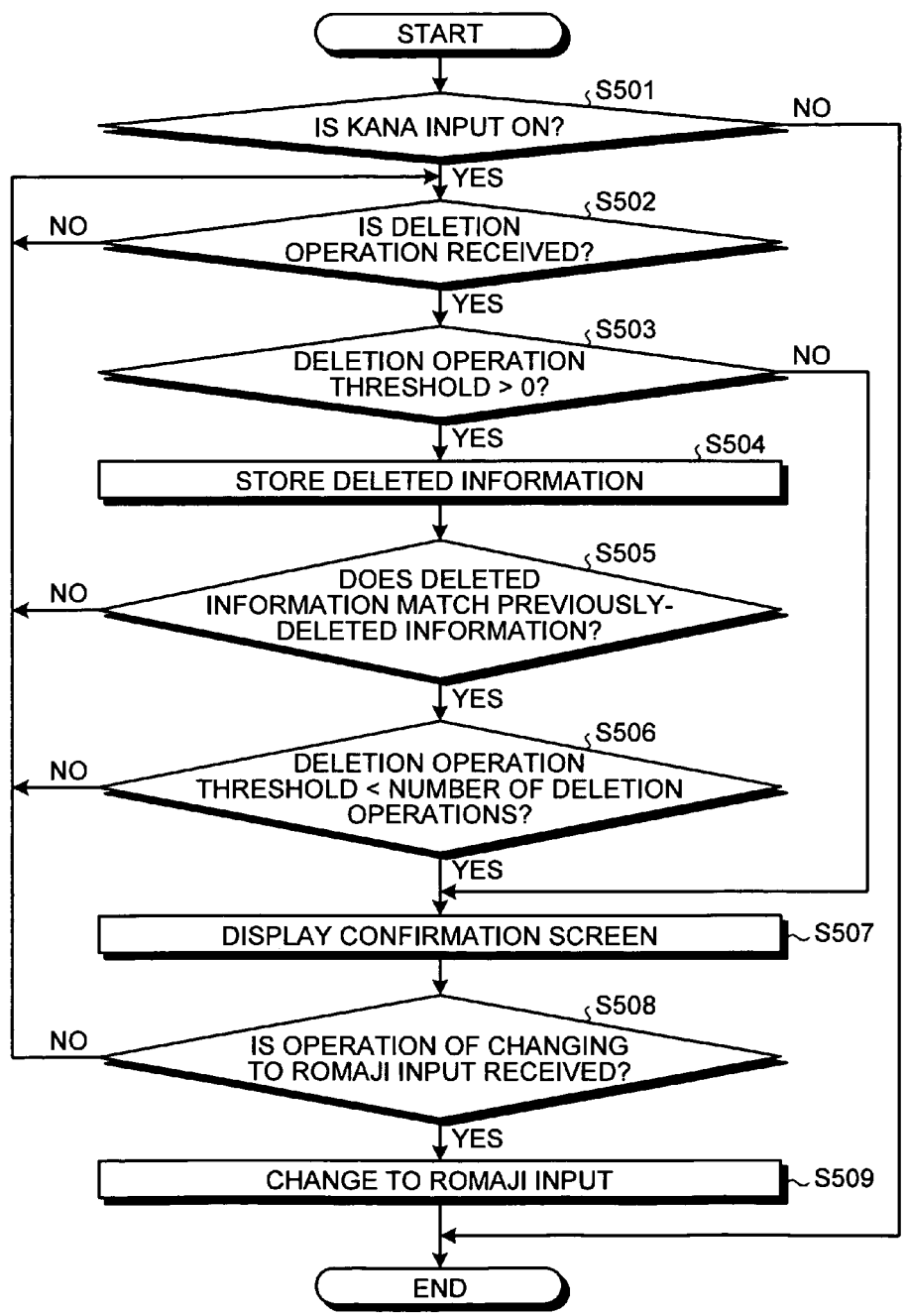
FIG. 14 is a flowchart of a procedure of a Kana (Japanese script) input-mode adjustment process performed by the information processing apparatus according to the third embodiment.

A procedure of a Kana (Japanese script) input-mode adjustment process performed by the information processing apparatus 300 according to the third embodiment will be described below. FIG. 14 is a flowchart of a procedure of the Kana input-mode adjustment process performed by the information processing apparatus 300 according to the third embodiment. The input mode of Kana is controlled by a Katakana-Hiragana-Romaji key. For example, a user can change the input mode to either "Kana input" or "Romaji input" by pressing the Katakana-Hiragana-Romaji key together with the Alt key.

As illustrated in FIG. 14, when the input mode is "Kana input" (YES at Step S501), the determining unit 141 of the information processing apparatus 300 monitors whether the deletion operation on the input information is performed. The processing procedure from Step S502 to Step S507 is the same as the processing procedure from Step S302 to Step S307 illustrated in FIG. 12.

When receiving operation of changing the input mode through the confirmation screen (YES at Step S508), the changing unit 242 of the information processing apparatus 300 changes the input mode of Kana to "Romaji input" (Step S509).

Figure 15:
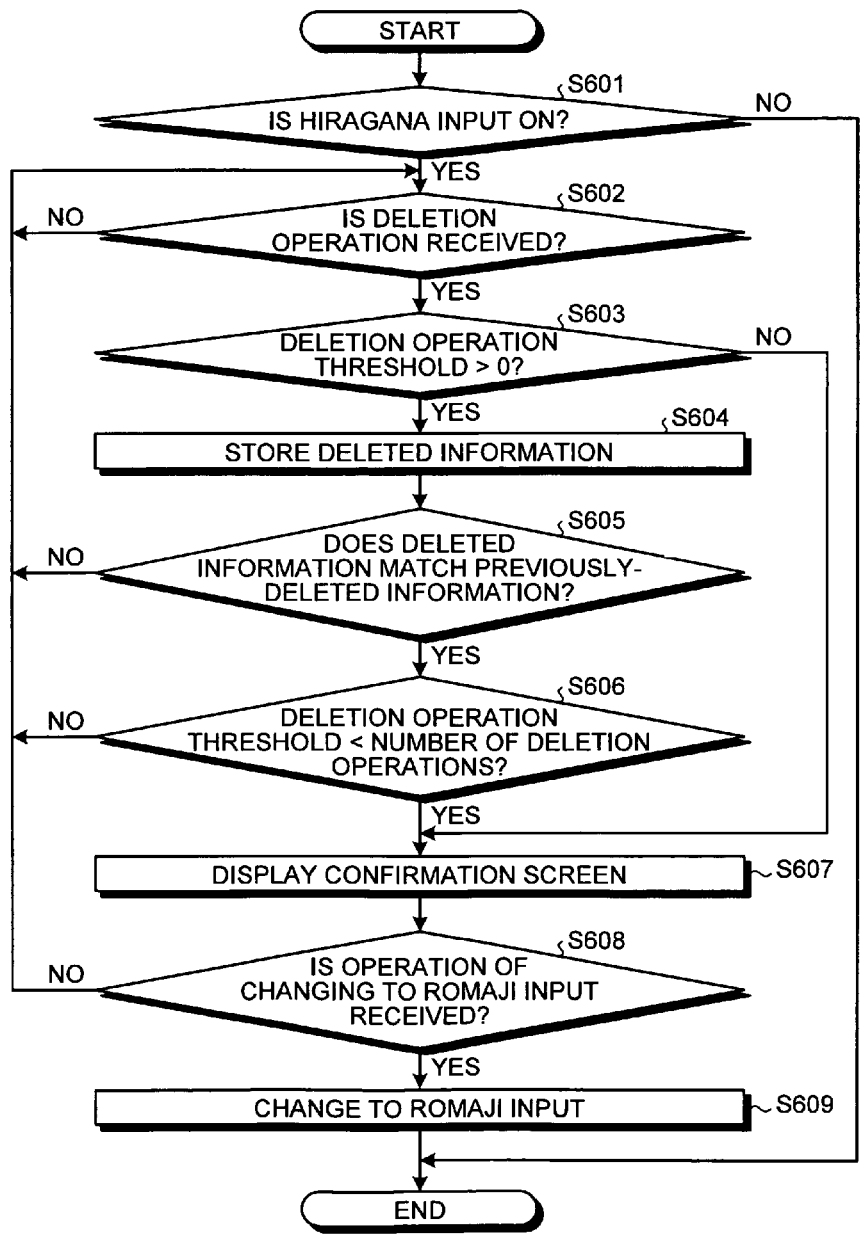
FIG. 15 is a flowchart of a procedure of a Katakana (Japanese characters) input-mode adjustment process performed by the information processing apparatus according to the third embodiment.

A procedure of a Katakana (Japanese characters) input-mode adjustment process performed by the information processing apparatus 300 according to the third embodiment will be described below. FIG. 15 is a flowchart of the procedure of the Katakana input-mode adjustment process performed by the information processing apparatus 300 according to the third embodiment. The Katakana input-mode is controlled by a Katakana-Hiragana-Romaji key. For example, when the input mode is "Kana input", a user can change the input mode to either "Hiragana" or "Katakana" by pressing the Katakana-Hiragana-Romaji key together with the Shift key.

As illustrated in FIG. 15, when the input mode is "Katakana" (YES at Step S601), the determining unit 141 of the information processing apparatus 300 monitors whether the deletion operation on the input information is performed. The processing procedure from Step S602 to Step S607 is the same as the processing procedure from Step S302 to Step S307 illustrated in FIG. 12.

When receiving operation of changing the input mode through the confirmation screen (YES at Step S608), the changing unit 242 of the information processing apparatus 300 changes the input mode of Kana to "Hiragana" (Step S609).

As described above, the information processing apparatus 300 according to the third embodiment can adjust the input mode that is controlled by a control key, such as the "Half-width/Full-width-Kanji key" or the "Katakana-Hiragana-Romaji key". The above explained is only an example, and the information processing apparatus 300 can adjust any other input modes that are controlled by other control keys, such as a "Scroll Lock key".

The information processing apparatus 300 illustrated in FIGS. 12 to 15 may change the input mode without confirming with a user whether the user changes the input mode, similarly to the information processing apparatus 100 according to the first embodiment.

[d] Fourth Embodiment

The information processing apparatuses 100, 200, and 300 described in the first to the third embodiments may be modified in various forms other than those of the first to the third embodiments. In a fourth embodiment, another example of the information processing apparatus 100 disclosed herein will be described.

Deletion Operation Threshold

The first to the third embodiments are explained with examples in which the information processing apparatus 100 or the like determines whether the input mode desired by a user is activated or not by using the deletion operation threshold stored in the storage unit 130. However, the information processing apparatus 100 or the like may update the deletion operation threshold stored in the storage unit 130.

For example, the information processing apparatuses 100 or the like may update the deletion operation threshold when the input-mode adjustment process is repeated a number of times during a predetermined period. More specifically, when the deletion operation threshold of "5" is stored in the storage unit 130, and if a user mistakenly presses a control key a number of times during a predetermined period (for example, during one day) and the information processing apparatus 100 performs the input-mode adjustment process a predetermined number of times or more (for example, five times or more), the information processing apparatus 100 may update the deletion operation threshold of "5" with a smaller value (for example, "3") so that the input-mode adjustment process can be performed at earlier timing. This is because it is reasonable to consider that a user that performs the input-mode adjustment process a number of times does not know how to operate the control key. In other words, it is considered preferable to perform the input-mode adjustment process for such a user before the user repeats the deletion operation a number of times. Consequently, the information processing apparatus 100 or the like can adjust the input mode at earlier timing when the information processing apparatus is used by a user who does not know how to operate the control keys.

Confirmation Screen

In the second and the third embodiments, examples are described in which the display unit 110 is controlled to display the confirmation screen for confirming whether to change the input mode. However, the information processing apparatus 200 or the like may not display the confirmation screen when receiving operation of changing the input mode from a user a predetermined number of times or more. This is because it is reasonable to consider that a user who performs the operation of changing the input mode every time the confirmation screen is displayed does not know how to operate the control keys. In other words, it is considered preferable to perform the input-mode adjustment process for such a user without confirming whether to change the input mode by using the confirmation screen. Consequently, the information processing apparatus 200 or the like can adjust the input mode without requesting a user to perform confirmation operation.

System Configuration

In the first to the third embodiments, it is explained that the information processing apparatuses 100, 200, and 300 adjust the input modes that are controlled by control keys, with concrete examples of the control keys. However, a single information processing apparatus may have the functions of all of the information processing apparatuses 100, 200, and 300. In this case, the storage unit 130 of the information processing apparatus may store a deletion operation threshold for each control key.

Computer that Executes an Input-Mode Adjustment Program

Figure 16:
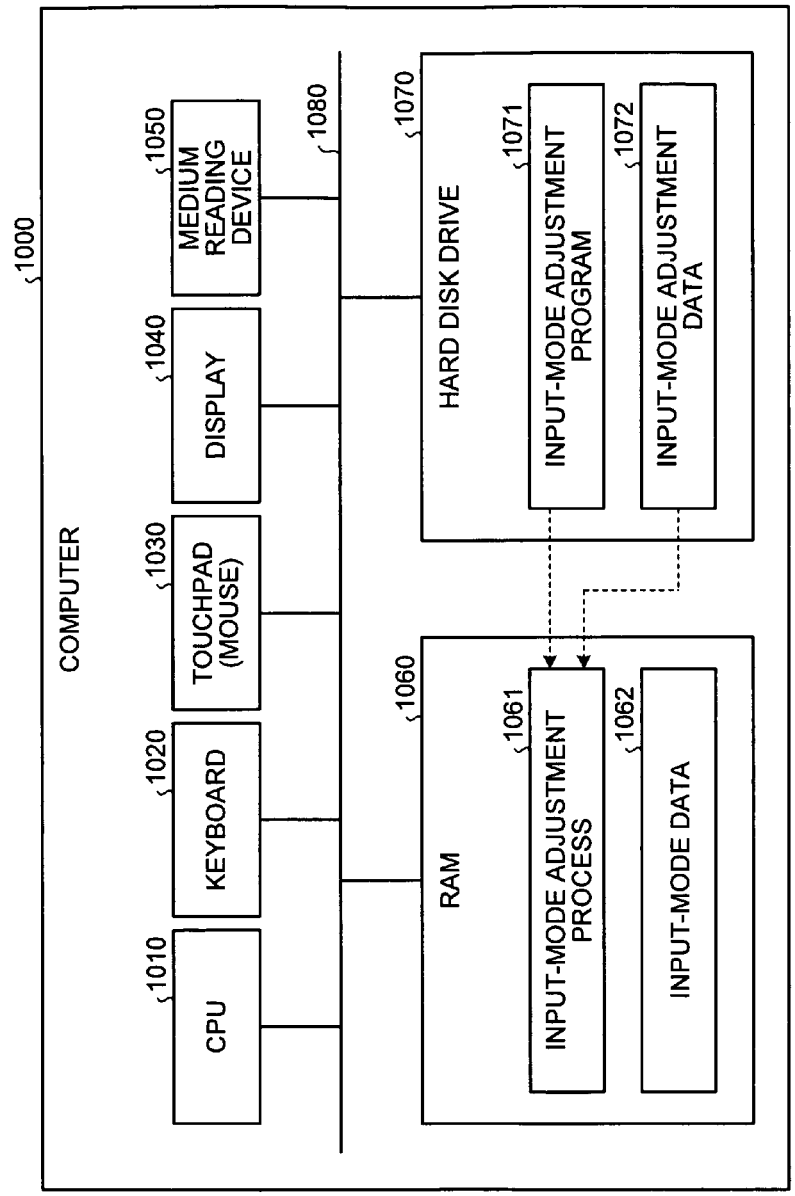
FIG. 16 is a diagram illustrating a computer that executes an input-mode adjustment program.

The various processing described in the first to the third embodiments may be realized by causing a computer, such as a personal computer or a workstation, to execute computer programs provided in advance. An example of a computer that executes an input-mode adjustment program having the same functions as those of the first to the third embodiments will be described below with reference to FIG. 16. FIG. 16 is a diagram illustrating a computer 1000 that executes the input-mode adjustment program.

As illustrated in FIG. 16, the computer 1000 includes a CPU (Central Processing Unit) 1010 for performing various arithmetic processing, a keyboard 1020 and a touchpad 1030 for receiving input of information from a user, a display 1040 for displaying various information, a medium reading device 1050 for reading computer programs and the like from a recording medium, a RAM 1060 for temporarily storing various information, a hard disk drive 1070, and a bus 1080 that connects the above components to one another.

An input-mode adjustment program 1071 having the same functions as those of the control unit 140 or the control unit 240 illustrated in FIG. 2 or FIG. 6 is stored in the hard disk drive 1070. Also, input-mode adjustment data 1072 corresponding to various types of data stored in the storage unit 130 illustrated in FIGS. 2 and 6 is stored in the hard disk drive 1070. It is also possible to appropriately distribute the input-mode adjustment data 1072 to store it in other computers connected via a network. Input-mode data 1062 as information on the "input mode", which is information currently assigned to keyboard 1020, is stored in the RAM 1060.

When the CPU 1010 reads the input-mode adjustment program 1071 from the hard disk drive 1070 and loads it on the RAM 1060, the input-mode adjustment program 1071 functions as an input-mode adjustment process 1061. The input-mode adjustment process 1061 appropriately loads information and the like read from the input-mode adjustment data 1072 on an area assigned thereto in the RAM 1060, and performs various data processing based on the loaded data, the input-mode data 1062, and the like.

The input-mode adjustment program 1071 need not be stored in the hard disk drive 1070, and may be stored in a recording medium, such as a CD-ROM, so as to be read and executed by the computer 1000. It is also possible to store the program in other computers (or servers) connected to the computer 1000 via a public line, the Internet, LAN (Local Area Network), WAN (Wide Area Network), and the like, and cause the computer 1000 to read and perform the program.

According to the information processing apparatus disclosed herein, it is possible to adjust an input mode to the state desired by a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
an input unit that includes
a key to input one of a first letter and a second letter; and
a control key to switch between information assigned to the key from one of the first letter and the second letter to the other one of the first letter and the second letter;
a determining unit that determines that the information assigned to the key is incorrect when the second letter is assigned to the key by operating the control key, a deletion operation is performed comprising inputting the second letter by operating the key and subsequently deleting the inputted second letter, and a number of repetitions of the deletion operation is equal to or greater than a predetermined threshold, wherein the predetermined threshold is at least two; and a changing unit that changes the information assigned to the key to the first letter when determining that the information assigned to the key is incorrect.

2. The information processing apparatus according to claim 1, further comprising:
a confirming unit that confirms with a user whether to change the information assigned to the key to the first letter when the determining unit determines that the information assigned to the key is incorrect,
wherein the changing unit changes the information assigned to the key to the first letter when the confirming unit confirms that the information assigned to the key is to be changed to the first letter.

3. The information processing apparatus according to claim 1, wherein the changing unit decreases the predetermined threshold after the changing unit changes the information assigned to the key to the first letter a predetermined number of times during a predetermined period.

4. The information processing apparatus according to claim 1, wherein the control key is a Num Lock key or a Caps Lock key.

5. An input-mode adjustment method implemented by an information processing apparatus, including an input unit that includes a key to input one of a first letter and a second letter and a control key to switch between the first letter and the second letter as information assigned to the key, the input-mode adjustment method comprising:
determining that the information assigned to the key is incorrect when the second letter is assigned to the key by operating the control key, a deletion operation is performed comprising inputting the second letter by operating the key and subsequently deleting the inputted second letter, and a number of repetitions of the deletion operation is equal to or greater than a predetermined threshold, wherein the predetermined threshold is at least two; and
changing the information assigned to the key to the first letter when the information assigned to the key is determined to be incorrect.

6. A non-transitory computer readable storage medium having stored therein an input-mode adjustment program causing an information processing apparatus, including an input unit that includes a key to input one of a first letter and a second letter and a control key to switch between the first letter and the second letter as information assigned to the key, to execute a process comprising:
determining that the information assigned to the key is incorrect when the second letter is assigned to the key by operating the control key, a deletion operation is performed comprising inputting the second letter by operating the key and subsequently deleting the inputted second letter, and a number of repetitions of the deletion operation is equal to or greater than a predetermined threshold, wherein the predetermined threshold is at least two; and
changing the information assigned to the key to the first letter when the information assigned to the key is determined to be incorrect.

7. An information processing apparatus comprising:
an input unit that includes
a key to input one of a first letter and a second letter; and
a control key to switch between information assigned to the key from one of the first letter and the second letter to the other one of the first letter and the second letter;
a processor; and
a memory, wherein the processor executes:
determining that the information assigned to the key is incorrect when the second letter is assigned to the key by operating the control key, a deletion operation is performed comprising inputting the second letter by operating the key and subsequently deleting the inputted second letter, and a number of repetitions of the deletion operation is equal to or greater than a predetermined threshold, wherein the predetermined threshold is at least two; and
changing the information assigned to the key to the first letter when the information assigned to the key is determined to be incorrect.

* * * * *